Figure 1:
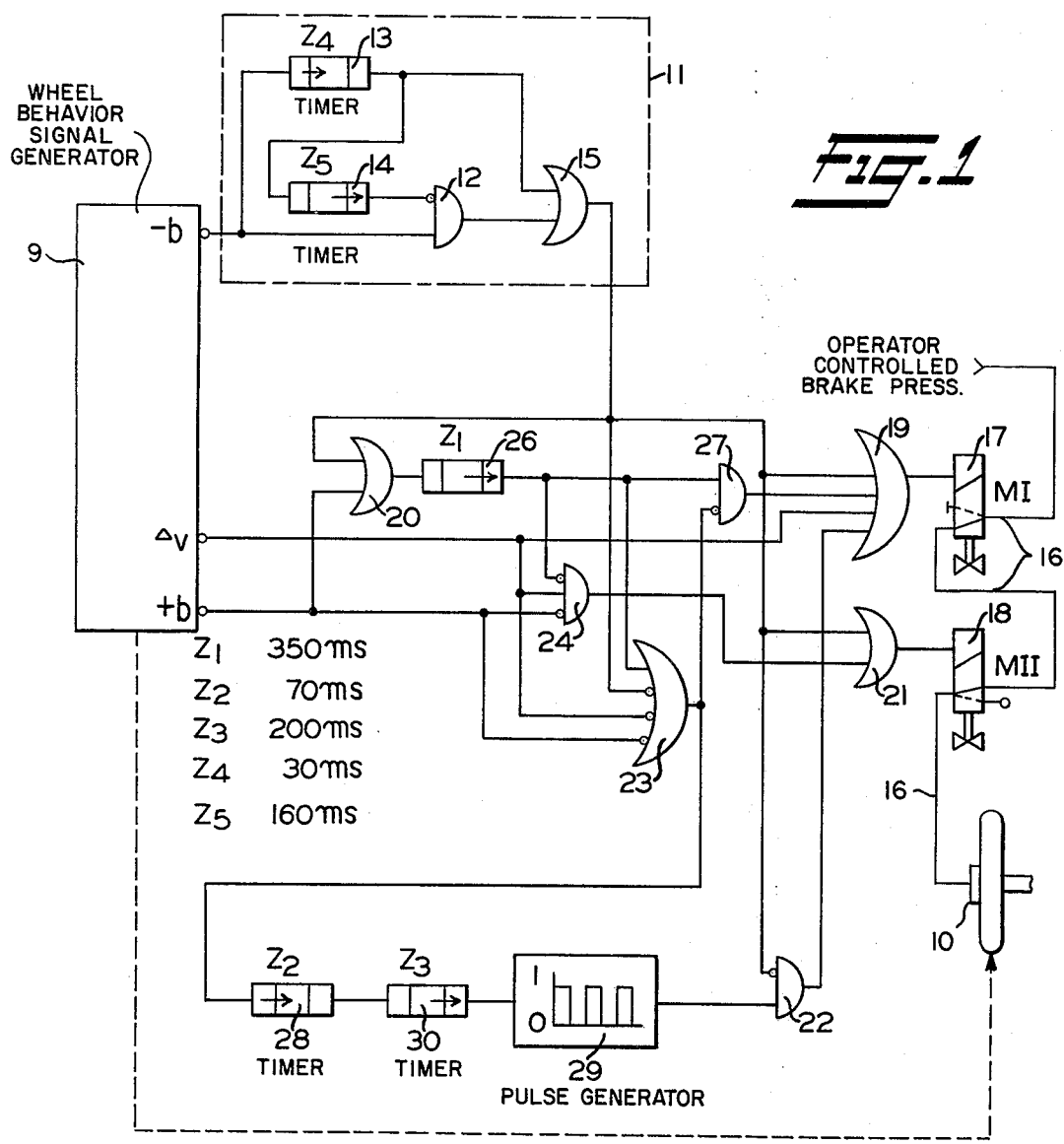

United States Patent [19]
Klatt

[11] 3,909,071
[45] Sept. 30, 1975

[54] VEHICLE ANTISKID BRAKE CONTROL SYSTEM

[75] Inventor: Alfred Klatt, Ronnenberg, Germany

[73] Assignee: WABCO Westinghouse G.m.b.H., Hannover, Germany

[22] Filed: Apr. 4, 1974

[21] Appl. No.: 457,820

[30] Foreign Application Priority Data
June 29, 1973 Germany............................ 2333126

[52] U.S. Cl.............................. 303/21 BE; 303/20
[51] Int. Cl.² ........................................... B60T 8/08
[58] Field of Search ............... 188/181; 303/20, 21; 307/10 R, 208, 293; 317/5, 141 R; 318/364; 324/161–162; 328/165; 340/53, 62

[56] References Cited
UNITED STATES PATENTS

| | | |
|---|---|---|
| 3,398,995 | 8/1968 | Martin ........................... 303/21 BE |
| 3,556,610 | 1/1971 | Leiber .............................. 303/21 P |
| 3,652,132 | 3/1972 | Ando et al. ..................... 303/21 CG |
| 3,756,663 | 9/1973 | Fink et al........................ 303/21 BE |
| 3,829,168 | 8/1974 | Schnaibel et al. .............. 303/21 BE |

*Primary Examiner*—Trygve M. Blix
*Assistant Examiner*—Stephen G. Kunin
*Attorney, Agent, or Firm*—R. W. McIntire, Jr.

[57] ABSTRACT

An electronic brake control system in which the wheel deceleration signal to the evaluation circuitry controlling the wheel modulator valves during a wheel skid is connected via a timing circuit capable of detecting and interrupting false deceleration signals arising due to wheel bounce in traversing a rough road surface, while at the same time maintaining the ability to conduct bona fide deceleration signals to the evaluation circuitry, all within a predetermined period following the appearance of either a false or bona fide deceleration signal.

7 Claims, 2 Drawing Figures

VEHICLE ANTISKID BRAKE CONTROL SYSTEM

BACKGROUND OF THE INVENTION

The present invention is concerned with an antiskid brake control system of the fluid pressure type in which an electronic evaluation circuit controls operation of modulator valve means to adjust the brake pressure depending upon wheel behavior signals generated in accordance with the dynamic characteristics of the wheel independently of an operator controlled foot valve device.

It has been found that vehicles traveling over uneven or rough road surfaces, particularly road surfaces having a "washboard" effect, exhibit longer stopping distances when equipped with an antiskid brake control system, such as the above-mentioned type. This is explained by the fact that the vehicle wheels alternately accelerate and decelerate due to the wheel bouncing action allowing only intermittent road contact.

Because of the high sensitivity and fast response made possible by the electronics, the short term, high amplitude deceleration signals generated by the wheel bounce are capable of being sensed and thus cause a reduction of the braking pressure through the modulator valve means, even though realistically the wheel is in a stable condition of rotation. Since the wheel is in no danger of a wheel skid, as such, the deceleration signals generated must be considered false signals and any response by the antiskid brake control system to these false deceleration signals results in the vehicle braking being less than what the actual wheel/road adhesion characteristic warrants.

In addition, these pressure reductions occurring in response to the false deceleration signals are always greater than the subsequent reapplication of brake pressure when the wheel accelerates upon resuming contact with the road surface, since the reapplication of brake pressure is not begun until the rate of wheel acceleration falls below a preselected threshold and the pressure gradient during the reapplication follows a considerably flatter curve than during a pressure reduction.

Accordingly, the inadvertent response of the antiskid brake system to wheel bounce causes extended stopping distances, as well as producing disproportionate braking of the respective vehicle wheels.

In the prior art, a method of counteracting the response of the antiskid brake system to wheel bounce is known, in which a brake pressure reduction occurs only after a deceleration signal has persisted for a preselected time duration sufficient to assure that the deceleration signal has arisen as a result of an imminent wheel skid condition existing. While this does, in fact, prevent false deceleration signals from effecting operation of the antiskid brake system, an inherent delay in operation also exists when traversing smooth road surfaces with which wheel adhesion may be reduced sufficient to cause a bona fide wheel slip, so that optimum wheel skid control cannot be obtained.

Still another prior art system is known which senses vertical acceleration forces of the wheels for the purpose of detecting a bouncing wheel and accordingly preventing response of the antiskid brake system. Such systems, however, are not only expensive but are difficult to maintain operative.

SUMMARY OF THE INVENTION

It is therefore the object of the present invention to provide a low-cost, yet reliable means of preventing operation of a vehicle antiskid brake control system when false wheel deceleration signals are generated, as a result of wheel bounce over rough road surfaces, without also compromising wheel skid control action and ultimately the vehicle stopping distance when a bona fide deceleration signal arises due to an actual wheel skid condition existing.

In fulfilling the above object, the present invention provides a timing circuit via which a deceleration signal is initially passed to the evaluation circuit for actuation of the system modulator valve means in a conventional manner. The timing circuit includes an AND gate and OR gate in series for transmitting the deceleration signal and a first timer that is activated by the deceleration signal after a predetermined delay. The output signal of the first timer acts in parallel with the deceleration signal via the OR gate and conventional evaluation circuit to actuate the modulator valve means, while at the same time activating a second timer whose output signal disables the AND gate and thereby prevents the deceleration signal from being passed to the evaluation circuitry for the duration the second timer is activated. The delay of the first timer is only slightly greater in duration than the expected short term pulse duration resulting from a false deceleration signal due to a bouncing wheel so that after the first deceleration pulse signal expires, additional short term signals are cut off from the evaluation circuit and an inadvertent response of the wheel antiskid control system is accordingly avoided for the duration the second timer is activated. Should a deceleration signal arise, however, having a time duration longer than the delay period of the first timer, it is recognized as a bona fide deceleration signal and is passed by the first timer to the evaluation circuit via the OR gate to initiate a typical cycle of wheel skid control action.

Figure 2:
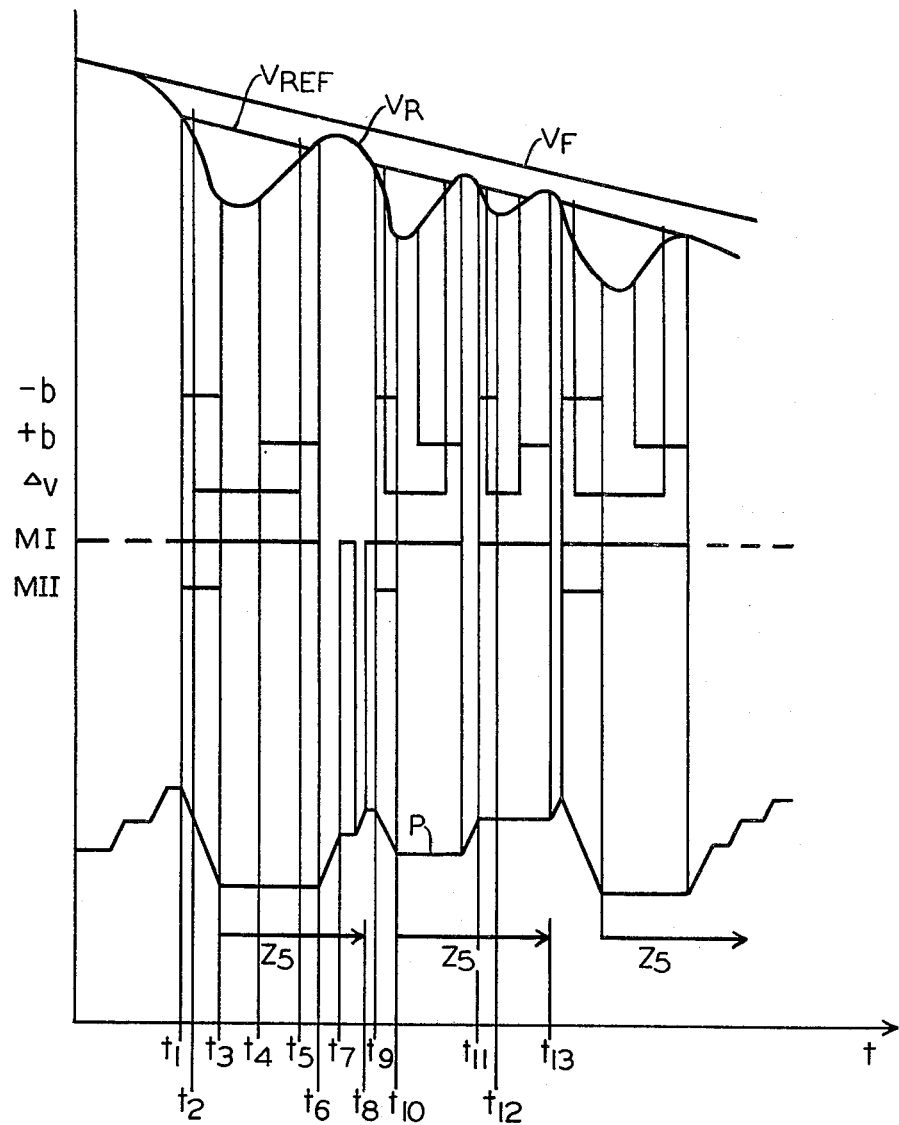

Other objects and attendant advantages of the present invention will become more apparent from the following more detailed description when taken with the accompanying drawings of which:

FIG. 1 shows an electronic analyzer circuit arranged to include the timer circuitry comprising the present invention; and FIG. 2 shows graph representing a brake pressure curve resulting from operation of the analyzer circuit including the present invention under different dynamic wheel conditions.

DESCRIPTION AND OPERATION

Referring to FIG. 1, input signals $-b$, $\Delta V$ and $+b$ are obtained via known wheel behavior signal generating means 9, which monitors the dynamic condition of a vehicle wheel. The $-b$ signal is indicative of that wheel decelerating at a rate exceeding a predetermined threshold at which the deceleration is likely to cause a wheel skid. The $\Delta V$ signal is generated when the wheel velocity $V_R$ becomes a predetermined percentage less than a reference velocity $V_{ref}$ shown associated with the curve appearing in the graph of FIG. 2. The $+b$ signal is generated when the wheel velocity attains a certain rate of acceleration in the process of regaining synchronous rotation following a wheel skid or incipient wheel skid.

The −b signal is connected to the input of a timing circuit 11 that is incorporated in the electronic evaluation circuit of FIG. 1. Timing circuit 11 comprises an AND gate 12 and a timer device 13 to which the −b signal at the circuit input is connected. Timer device 13 is the slow pickup type having a time delay Z4. The output of timer device 13 is connected in parallel to the input of a timer device 14 and to one input of an OR gate 15. Timer device 14 is the delay on drop out type that provides an output signal at the inverted input of AND gate 12 for a duration Z5 following expiration of time delay Z4. The output of AND gate 12 is connected to a second input of OR gate 15, whose output is connected directly to one input of an OR gate 19, an OR gate 20, another OR gate 21 and to an inverted input of an AND gate 22 and an AND gate 23.

The ΔV signal is fed directly to another input of the OR gate 19 and the input of an AND gate 24, as well as to an inverted input of AND gate 23.

The +b signal is connected directly to another input of OR gate 20, as well as to another inverted input of AND gates 23 and 24.

The signal emitted by OR gate 20 is transmitted to a timer device 26, whose output signal is maintained a predetermined duration $Z_1$ after the input signal supplied by OR gate 20 disappears. The output signal of timer device 26 is fed to an input of an AND gate 27 and AND gate 23, as well as to another inverted input of AND gate 24.

The output signal of AND gate 24 is connected to the second input of OR gate 21, whose output signal controls energization of a solenoid 18 of an electro-pneumatic modulating valve MII located in the brake cylinder line 16 leading to the wheel brake cylinder device 10 to which operator controlled fluid brake pressure is connected via line 16. In the energized state of solenoid 18, modulating valve MII is actuated to a position in which the brake cylinder pressure is exhausted to atmosphere and in the deenergized state, assumes a normal position interrupting the exhaust of brake cylinder pressure.

The output signal emitted by AND gate 23 is transmitted to the inverted second input of AND gate 27 and to the input of a timer device 28, whose output signal fails to appear until a predetermined duration $Z_2$ after an input signal is supplied. During timing period $Z_2$, reapplication of brake pressure is provided to overcome the braking hysteresis as set forth in copending U.S. Pat. application, Ser. No. 404,849, entitled "Anti-Wheel Skid Control System Providing Controlled Reapplication of Brake Pressure." The output signal of timer device 28 is connected to a timer device 30, having a timing period $Z_3$, during which an output signal is emitted to a conventional pulse generator 29. The output signals of pulse generator 29 are transmitted to the second input of AND gate 22, whose output is connected to another input of OR gate 19.

OR gate 19, to which is also connected the output of AND gate 27, has its output connected to a solenoid 17 of an electro-pneumatic modulating valve MI also located in the brake cylinder delivery line 16 ahead of modulating valve MII. In the energized state, solenoid 17 causes actuation of modulating valve MI to a position in which the delivery of brake cylinder pressure is interrupted and when deenergized, allows valve MI to assume a normal position in which the supply of delivery pressure to the wheel brake cylinder 10 is provided.

The following example of operation may be followed with reference to the graph of FIG. 2. Upon initiation of brake pressure to the vehicle wheels, let it be assumed that the deceleration of one of the wheels having a brake cylinder 10 exceeds the preselected threshold so that a −b signal is generated at time t1. As the wheel velocity decreases below a certain wheel velocity threshold at time $t_2$, the ΔV signal appears concurrently with the −b signal already present.

The −b signal is effective at the input of timing circuit 11 and, during the delay period Z4 of timer 13, is transmitted to the evaluation circuitry via AND gate 12 and OR gate 15. As soon as the delay period Z4 expires, timer 13 provides an output signal corresponding to the deceleration signal −b, which is transmitted to the evaluation circuit via OR gate 13. The output of timer 13 concurrently activates timer 14 whose output disables AND gate 12 for the duration Z5, which is selected so that each subsequent occurrence of deceleration signal −b is cut off from the evaluation circuit except when occurring at a frequency below a predetermined frequency.

The −b signal emitted by OR gate 15 at time $t_2$ energizes solenoid valve 17 via OR gate 19 to effect closure of modulating valve MI, and solenoid 18 via OR gate 21 to open modulating valve MII. It will be noted that in the case of modulating valve MI, energization may already have been in effect due to a previous cycle of wheel skid control. This control of the respective modulating valves MI and MII results in the reduction of brake pressure at the brake cylinder 10 of the wheel generating the deceleration signal −b until the deceleration is reduced below the deceleration threshold. This is seen to occur at time $t_3$, at which point deceleration signal −b vanishes and modulating valve MII is restored to its normally closed condition to terminate the reduction of brake pressure. Since the ΔV signal is still present, however, solenoid valve 17 is energized by the ΔV signal acting via OR gate 19 to maintain the closed condition of modulating valve MI and accordingly withhold the reapplication of brake pressure, which is held constant.

In this holding phase, the wheel continues to resume acceleration, with acceleration signal +b appearing concurrent with velocity signal ΔV at time $t_4$ when the acceleration rate exceeds the predetermined acceleration threshold. When the wheel velocity at time $t_5$ increases to a level insufficient to maintain velocity signal ΔV, modulating valve MI is maintained in its closed condition due to acceleration signal +b maintaining energization of solenoid 17 via OR gate 20, timer 26, AND gate 27 and OR gate 19.

As the wheel subsequently approaches synchronous rotation, i.e., rotation without skidding, acceleration signal +b finally disappears at time $t_6$ and timer 26 concurrently begins to time out for a duration Z1. During this timing period Z1, the reapplication of break pressure now takes place as follows. With the absence of signals −b, ΔV and +b, as well as the presence of an output signal from timer 26, AND gate 23 becomes enabled and transmits its output signal to AND gate 27 and timer 28. This results in AND gate 27 being disabled to prevent the output from timer 26 from energizing solenoid 17 of modulator valve MI, while at the same time energizing timer 28. Thus, a brief delay period Z2 is imposed by timer 28 until it picks up, during which delay solenoid 17 is deenergized and modulator valve MI is accordingly restored to its normally open condition for effecting the reapplication of brake pressure. This initial reapplication of brake pressure occurs at a relatively rapid rate until the time delay Z2 expires at time $t_7$.

Upon expiration of time delay Z2, timer 28 emits an output signal to timer 30, which in turn establishes a time period Z3 during which period pulse generator 29 is activated to establish a pulsed phase of brake control. The pulse signals emitted by pulse generator 29 are transmitted to solenoid 17 of modulator valve MI via AND gate 22 and OR gate 19 such that modulator valve MI is periodically actuated between a normally open and a closed condition. This results in the stepped reapplication of brake pressure P to produce a relatively slow reapplication rate, so that the wheel velocity curve VR in FIG. 2 can follow the theoretical reference velocity curve $V_{ref}$ representing the optimum utilization of braking force.

Now during this pulsed phase of control and prior to the brake pressure being reapplied sufficient to cause the wheel deceleration to subsequently exhibit a skidding tendency, as indicated by deceleration signal $-b$ at time $t_9$, the time period Z5 provided by timer 14 expires. The system is thus prepared for a new cycle of wheel skid control when deceleration signal $-b$ appears.

Once again, the deceleration signal is transmitted via timing circuit 11 to energize solenoid valves 17 and 18 of the respective modulator valves MI and MII, thereby effecting a reduction of the wheel brake pressure, as previously explained. Concurrently, timer 13 is triggered to in turn trigger timer 14 after a delay period Z4. This occurs at time $t_{10}$, at which point a new timing period Z5 is begun.

Let it be assumed now that a subsequent wheel deceleration signal $-b$ arises at a point in time $t_{11}$ prior to expiration of timing period Z5, due to the wheel decelerations and accelerations occurring very quickly as a result of wheel bounce in traversing a rough road surface. Let it also be understood that the time delay Z4 is selected so as to not expire before the short term deceleration signal $-b$ disappears when the bouncing wheel reestablishes contact with the road surface. In that AND gate 12 is disabled by timer 14 during time period Z5 and timer 13 fails to respond for the duration a short term deceleration signal $-b$ is present at the input of timing circuit 11, it will be apparent that from time $t_{11}-t_{12}$ the short term deceleration signal $-b$ is blocked. Accordingly, false deceleration signals arising for short term durations as a result of wheel bounce during a cycle of wheel skid control are prevented by timing circuit 11 from reaching the remaining portion of the analyzer circuitry. Modulator valve MII thus does not respond and the occurrence of inadvertent oscillations to recurring false deceleration signals by the wheel skid control system is avoided.

While modulator valve MII is prevented from releasing brake pressure in response to these false deceleration signals, modulator valve MI remains in its closed condition due to energization of solenoid 17 thereof by velocity signal $\Delta V$ acting via OR gate 19 so that the wheel brake pressure P is actually held constant until time $t_{13}$ when acceleration signal $+b$ disappears.

While only a single false deceleration signal $-b$ has been shown in the graph of FIG. 2 during period Z5 for purposes of clarity, it should be understood that in actual practice a greater number of repetitious false deceleration signals would likely appear, each being blocked, however, in accordance with the invention, as described.

Having now described the invention, what I claim as new and desire to secure by Letters Patent is:

1. An antiskid brake control system for a vehicle comprising:
   a. monitoring means for generating a plurality of different wheel behavior signals representative of the dynamic conditions of a respective wheel of the vehicle;
   b. valve means for modulating operator controlled fluid brake pressure supplied to a brake device of said wheel;
   c. evaluation means to which said wheel behavior signals are connected for controlling said modulating valve means according to the dynamic behavior of said wheel; the improvement comprising
   d. timing means for effecting said connection of at least one of said wheel behavior signals to said evaluation means and for providing first and second timing periods, said second timing period being established following expiration of said first timing period, said connection of said at least one of said wheel behavior signals being interrupted by said timing means during said second time period when the time duration of said at least one of said wheel behavior signals is less than the time duration of said first time period.

2. The system as recited in claim 1, further characterized in that said second time period is of longer time duration than said first time period.

3. The system as recited in claim 1, further characterized in that said at least one of said wheel behavior signals is generated when the wheel deceleration exceeds a certain threshold level.

4. The system as recited in claim 1, wherein said timing means comprises:
   a. first and second parallel circuit paths via which said at least one of said wheel behavior signals is connected to said evaluation means;
   b. first means for establishing said first time period during which said connection of said at least one of said wheel behavior signals via said first path is interrupted, and
   c. second means for establishing said second time period during which said connection of said at least one of said wheel behavior signals via said second path is interrupted.

5. The system as recited in claim 4, wherein said timing means further comprises:
   a. an OR gate having first and second inputs to which said first and second circuit paths are connected and an output for connecting said at least one of said wheel behavior signals to said evaluation means when said at least one of said wheel behavior signals is present at either one of said first and second inputs;
   b. an AND gate having one input and an output connected in said second circuit path;
   c. said first means including a first timer in said first path for providing said first time period during which connection of said at least one of said wheel behavior signals via said first circuit path is interrupted; and d. said second means including a second timer subject to the output of said first timer upon expiration of said first time period for establishing said second time period during which the output of said second timer is connected to another input of said AND gate to disable the output thereof so as to interrupt connection of said at least one of said wheel behavior signals via said second path.

6. The system as recited in claim 5, further characterized in that said first timer is actuated after a certain time delay following the appearance of said at least one of said wheel behavior signals to establish said first time period.

7. The system as recited in claim 6, further characterized in that the output of said second timer is maintained an extended time duration following expiration of said first time period to establish said second time period.

* * * * *